United States Patent Office 3,584,038
Patented June 8, 1971

3,584,038
OXIDATIVE TREATMENT OF MONONUCLEAR AROMATIC COMPOUNDS
Bruno J. Barone, Houston, and Louis J. Croce, Seabrook, Tex., assignors to Petro-Tex Chemical Corporation, Houston, Tex.
No Drawing. Continuation-in-part of application Ser. No. 598,172, Dec. 1, 1966, which is a continuation-in-part of abandoned application Ser. No. 598,140, Nov. 10, 1966. This application Mar. 29, 1968, Ser. No. 717,375
Int. Cl. C07c 51/26, 63/02
U.S. Cl. 260—524R
18 Claims

ABSTRACT OF THE DISCLOSURE

A process for the oxidation of mononuclear aromatic compounds having at least one oxidizable group selected from methyl, hydroxymethyl, and aldehyde, in the presence of oxygen, cobaltous or cobaltic ions and molybdenum ion, at about 60° C. to about 160° C., and at atmospheric pressure or greater.

BACKGROUND OF THE INVENTION

This application is a continuation in part of Ser. No. 598,172, filed Dec. 1, 1966, which was a continuation in part of Ser. No. 598,140 filed Nov. 10, 1966, now abandoned.

This invention relates to an improved method for the oxidation of aromatic compounds characterized by a single aryl group having at least one oxidizable group selected from methyl, hydroxymethyl, and aldehyde. More particularly, the invention relates to an improved process for the efficient and economical conversion of suitable methyl and dimethyl substituted monoaryl compounds to aromatic monobasic and dibasic acids.

Previous studies in this field have evolved a variety of proposed processes for the catalytic liquid phase oxidation of alkylated aromatic compounds in the presense or absence of a solvent by means of air or oxygen using various metals or salts thereof as catalysts. A variety of organic compounds such as peroxide, aldehydes, and ketones, have been proposed and utilized as reaction initiators or activators, and at least one commercial process employs bromine or bromides as catalytic aids.

French Pat. 1,392,284 discloses the use of metals having a valence greater than one and a single valence state as effective co-catalysts with cobaltous or cobaltic ions for the conversion of specified aromatic compounds to aromatic carboxylic acids. Yields reported in the patent without the use of additional catalytic agents are said to be from 45 percent to 70.8 percent desired product.

The present invention has for its principal object the provision of a novel process for the economical and efficient conversion of aromatic compounds to useful oxidation products such as toluic acid, terephthalic acid, and various other compounds. A further object is to provide a method whereby methyl and dimethyl substituted benzenes may be directly oxidized to the desired products without the necessity of going through intermediate steps. Additional objects include the provision of such a process which yields directly products of high purity or having a small content of readily separable impurities, and which involves reaction conditions that are operable at low cost and readily controlled.

The above and other objects are accomplished in accordance with this invention by carrying out the reaction with the materials and the operating conditions hereinafter described. All parts are by weight unless specified otherwise.

SUMMARY OF THE INVENTION

Broadly, the invention comprises reacting a monoaryl compound containing at least one oxidizable group selected from methyl, hydroxymethyl, and aldehyde with oxygen in an inert medium or solvent at a temperature of from about 60° C. to about 160° C. at atmospheric pressure or greater, and in the presence of a catalytically active or effective amount of cobaltous ion, cobaltic ion, or mixtures thereof, and effective or co-catalytic amounts, as more particularly hereinafter described, of specified molybdenum catalysts. More particularly the invention comprises a process for the oxidation of compounds of the type described in an inert medium or solvent at a temperature of from about 60° C. to about 150° C. at atmospheric pressure or greater, and in the presence of from about 0.3 to 24 grams per liter cobaltous or cobaltic ion, or mixtures thereof, and a co-catalytically active or effective amount of molybdenum ion, in a ratio of from about 0.3 to about 0.007 gram pre liter Mo ion per grams per liter Co ion. In its preferred form the invention comprises a process for the oxidation of methyl or dimethyl substituted monoaryl compounds in an inert medium or solvent with oxygen at a temperature of from about 60° C. to about 150° C. at atmospheric pressure or greater, and in the presence of from 0.3 to 24 grams per liter cobaltous or cobaltic ion, or mixtures thereof, and a catalytically active or effective amount of molybdenum ion, in a ratio of from about 0.1 to about 0.007 gram per liter Mo ion per gram per liter Co ion.

As may be seen, the process of the invention is applicable to a wide variety of materials. Typical starting materials include toluene, p-xylene, m-xylene, hydroxymethyl benzene (benzyl alcohol) and benzaldehyde, or mixtures containing such compounds. The aromatic starting material may contain, in addition to the specified group or groups, other nuclear substituents inert to the oxidation reaction, such as chlorine, bromine, fluorine, nitro, carboxyl, alkoxy, aryloxy, or tertiary alkyl groups. Typical conversions include toluene to benzoic acid, m-xylene or m-toluic acid to isophthalic acid, p-xylene or p-toluic acid to terephthalic acid, 1,4-dimethyl-2-chlorobenzene to chloroterephthalic acid, and 1,4-dimethyl-2-nitrobenzene to nitroterephthalic acid. Additional conversions attainable by the present invention include conversion of terephthaldehyde and p-tolualdehyde to terephthalic acid, and isophthalic aldehyde to isophthalic acid. Although no particular concentrations of the monoaryl compound are required, in practice concentrations of from about 0.3 mol per liter to about 3.5 mols per liter, based on the total amount of solution present, are suitable. Concentrations from about 0.8 to about 3.0 mols per liter are preferred.

As noted above, either cobaltous or cobaltic ion (or both) should be present in amount corresponding to the initial provision of a cobalt salt soluble in the above solution, such as cobaltous acetate, propionate, or butyrate, to the extent of about 0.3 to 24 grams of cobaltous or cobaltic ions per liter of solution, although an amount of from about 0.4 to 15 grams is preferred. Thus, with the use of a 1 molar solution of the starting aromatic compound in acetic acid, the desired cobalt concentration may be supplied by the initial provision of about 0.03 to 0.20 mol of cobaltous acetate per liter of solution. Examples of cobaltous compounds which may be utilized are $Co(OAC)_2 \cdot 4H_2O$, cobaltous chloride, cobaltous acetylacetonate, etc., while cobaltic compounds are exemplified by cobaltic acetylacetonate and cobaltic acetate.

A small amount of water is preferred in the system, e.g., 0.001 to 0.02 mol per liter of the monocarboxylic acid media, more particularly hereinafter described, in order to reduce the induction period and to insure complete solubility of the cobalt compound. Water need not be used with the acetylacetonates. The water may be introduced directly or by use of hydrated materials.

Suitable temperatures for the oxidation process in accordance with this invention are within the range of 60° C. to about 130° C. at atmospheric pressure, although temperatures up to about 160° C. may at times be used, with somewhat higher pressures up to about 50 atmospheres. The preferred operating temperatures are within the range of 80° C. to 130° C.

While air is the most economical source of oxygen, any suitable oxygen-containing gas such as pure oxygen, ozone, or mixtures of such gases with inert gaseous diluents may be employed. It will, of course, be understood that in oxidizing substituted aromatic compounds in accordance with the invention, the oxygen supplied by continuous introduction of air or other oxygen-containing gas, as explained above, is the fundamental source of oxygen for the oxidation reaction, and sufficient oxygen must be supplied to complete the reaction.

It has been found that molybdenum ions are effective, in conjunction with cobaltous or cobaltic ions, in improving the yields of the desired products. In particular the $Mo^{6+}$ ion shows superior activity and it is possible that the lesser activity of the $Mo^{4+}$ and $Mo^{2+}$ ions is due to their oxidation to the higher oxidation state under the conditions of the system. The $Mo^{6+}$ ion is therefore the preferred co-catalytic agent. The Mo ions are supplied generally in the form of compounds which are sufficiently soluble in the system to provide an effective or co-catalytic amount of the ions. Thus the Mo compounds may be supplied in the form of salts, oxides, hydroxides, complexes, and mixtures thereof, provided the requisite solubility is present. The molybdenum ions may be added in the form of compounds or complexes such as the oxalates, the acetylacetonates, the alcoholates, the chlorides, the octoates, acetylacetates and the like. Salts of the lower fatty acids are especially useful, e.g., the acetates, propionates, and butyrates.

The ratio of the concentration of the molybdenum ions in relation to the concentration of the cobaltous or cobaltic ions is significant and should be maintained at from about 0.3 to about 0.007. Preferred values of $C^c/C{mb}$ are from about 0.1 to about 0.01. Thus, a typical reaction mixture might contain about 0.1 gram per liter of molybdenum ion in relation to about 6.0 grams per liter of cobalt ion. In practice, the Mo ions may be present in a concentration of from about .007 gram per liter to about 8.0 grams per liter, although these are not to be taken as limiting amounts. Preferred concentrations are from about 0.08 gram per liter to about 6.0 grams per liter. The total amount of Mo ions can be added in portions or stages, as long as sufficient amount is present to enhance or give the desired catalytic effect.

The reaction is carried out in a suitable solvent or medium which is inert to the reactants or products under the oxidative conditions of the process, or is carried out in a solvent or medium which may be oxidized by the system to materials inert to the reactants or products. Preferred media for carrying out the reaction under the conditions set forth as described above, are the monocarboxylic acids selected from the group consisting of aliphatic acids having 2 to 6 carbon atoms, mixtures thereof, and aryl aliphatic acids having from 8 to 12 carbon atoms, and mixtures thereof. Acetic acid is preferred, although such media as propionic, butyric, trimethyl acetic, phenyl acetic, and/or such derivatives as methoxy acetic, and the like, may be used.

Although not required, prior art catalytic aids and "initiators," may be employed to aid in the attack on the hydrocarbon molecule, especially at lower temperatures. The preferred initiators are aldehydes and ketones such as paraldehyde, acetaldehyde, and methyl ethyl ketone. In general, aldehydes and ketones of 3 to 10 carbon atoms are suitable. The aldehydes, propionaldehyde, tolualdehyde and isobutyraldehyde, and the ketones diethyl ketone, methyl propyl ketone, and 2,5-hexanedione are particularly effective. The initiator, when utilized, is present at the beginning of the reaction or is added incrementally in a total amount usually from about 0.01 to about 0.5 mol per liter of solution. The initiator may also be added after the fashion described in U.S. application Ser. No. 617,803, to Barone, filed Feb. 23, 1967, wherein the initiator, or the major portion thereof, is added during the period in the course of the reaction that the reaction experiences its maximum rate of oxidation or oxygen uptake.

EXAMPLE I

An acetic acid solution containing 1.0 mol per liter p-xylene, 5.9 grams per liter cobaltous ion as cobalt acetate-tetrahydrate, and 0.1 gram per liter of molybdenum as molybdenyl acetylacetonate, was charged into a reactor provided with suitably valved gas inlet and outlet lines for admission of oxygen. The temperature of the reactor was held at 100° C. and the reaction carried out under atmospheric pressure. As a matter of convenience, the reaction was carried out for over 23 hours, although it was clear that the bulk of the oxidation had been completed long before the end of this time period. The amount of p-xylene oxidized was 100 percent of that employed, and gave a terephthalic acid yield of 75.9 percent. The yield of p-toluic acid was 23.0 percent.

EXAMPLE II

The procedure of Example I was repeated utilizing 3.3 grams per liter of molybdenum ion as molybdenum trioxide. Results showed 100 percent of the p-xylene was consumed to give yields of 32.4 percent p-toluic acid and 66.6 percent terephthalic acid respectively.

EXAMPLE III

The procedure of Example I was repeated except that 0.36 gram per liter of molybdenum as the oxalate was utilized. The conversion of p-xylene was 100 percent for a terephthalic acid yield of 77.4 percent and a p-toluic acid yield of 21.4 percent.

EXAMPLE IV

The procedure of this example was similar to that of Example I except that the temperature was raised to 120° C., the pressure was increased to about 34 atmospheres, and reaction time was reduced to 6 hours. The addition of the reactants was somewhat varied in that four-fifths of the acetic acid and one-half of the para-xylene were added and reacted until the initiation of the reaction and then the remaining acetic acid and para-xylene were added over a 60 minute period during the maximum oxygen absorption. The conversion of p-xylene was 94 percent for a terephthalic acid yield of 64 percent and a p-toluic acid yield of 33.4 percent.

EXAMPLE V

An acetic acid solution containing about 0.5 mol per liter p-xylene, about 0.027 mol per liter of paraldehyde, and sufficient cobaltous ion and molybdenum ion as cobalt acetate tetrahydrate and molybdenyl acetyl acetonate to make final concentrations in the system of about 5.9 grams per liter Co ion and about 0.1 gram per liter Mo ion, respectively, were added to a reactor provided with suitably valved gas inlet and outlet lines for admission of oxygen. The temperature of the reactor was held at 120° C. and the reaction was carried out at about 34 atmospheres of pressure. After the reaction was started an additional 0.5 mol/liter of p-xylene, 165 grams of acetic acid, and 0.11 mol per liter of paraldehyde were added over a 60 minute period during the maximum absorption of oxygen. The reaction was stopped after 3 hours at which time 97 percent of the p-xylene had been converted. The yield of terephthalic acid was 94.6 percent.

While there are above disclosed but a limited number of embodiments of the process of the invention herein

We claim:

1. A process for oxidizing monoaryl compounds containing at least one member selected from the group consisting of methyl, hydroxymethyl, and aldehyde to aromatic monobasic and dibasic acids comprising contacting said monoaryl compound with oxygen in an inert solvent and in the presence of a member selected from the group consisting of cobaltous ion, cobaltic ion, and mixtures thereof; and a cocatalytically active amount of molybdenum ion in solution in a ratio of from about 0.3 to 0.007 to said cobaltous ion, cobaltic ion, and mixtures thereof, said contacting being carried out at a temperature of from about 60° C. to about 160° C. and at atmospheric pressure or greater.

2. The process of claim 1 wherein the monoaryl compound is present in an amount of from about 0.3 to about 3.5 mols per liter, based on the total amount of solution present, the pressure is from about 1 to about 100 atmospheres, and the cobaltous ion, cobaltic ion, or mixtures thereof is present in an amount of from about 1.0 to 24 grams per liter.

3. The process of claim 2 wherein the solvent is selected from the group consisting of aliphatic acids having 2 to 6 carbon atoms, mixtures thereof, and aryl aliphatic acids having 8 to 12 carbon atoms, and mixtures thereof, and the molybdenum ion has an oxidation state of 6+.

4. The process of claim 3 wherein the monoaryl compound is present in an amount of from about 0.8 mol per liter to about 3.0 mols per liter, based on the total amount of solution.

5. The process of claim 3 wherein the member selected from the group consisting of cobaltous ion, cobaltic ion, and mixtures thereof, is present in an amount of from about 1.0 to about 8 gram atoms per liter, and the molybdenum ion is present in a amount of from about 0.007 gram per liter to about 8.0 grams per liter.

6. The process of claim 5 wherein the acid is an aliphatic acid having 2 to 6 carbon atoms.

7. The process of claim 6 wherein the temperature is from 70° C. to 130° C.

8. The process of claim 7 wherein the monoaryl compound is p-xylene.

9. The process of claim 8 wherein there is present 0.001 to 0.02 mol per liter of water.

10. The process of claim 9 wherein the molybdenum is present in an amount of from 0.08 gram per liter to about 10.0 grams per liter.

11. A process for oxidizing monoaryl compounds containing at least one member selected from the group consisting of methyl, hydroxylmethyl, and aldehyde to aromatic monobasic and dibasic acids comprising contacting said monoaryl compound with oxygen in an aliphatic acid having 2 to 6 carbon atoms, and mixtures thereof, in the presence of from about 0.3 to about 24 grams per liter of a member selected from the group consisting of cobaltous ion, cobaltic ion, and mixtures thereof; a catalytically active amount of molybdenum ion in solution in a ratio of about 0.3 to 0.007 to said cobaltous ion, cobaltic ion, and mixtures thereof, and 0.01 to .05 mol per liter of an initiator comprising a ketone or an aldehyde, said contacting being carried out at a temperature of from 70° C. to 160° C. and a pressure of from 1 to 100 atmospheres.

12. The process of claim 11 wherein the monoaryl compound is present in an amount of from about 0.3 mol per liter to about 3.5 mols per liter, based on the total amount of solution present and the cobaltous ion, cobaltic ion or mixtures thereof is present in an amount of from about 0.4 to 15 grams per liter.

13. The process of claim 12 wherein the member selected from the group consisting of cobaltous ion, cobaltic ion, and mixtures thereof, is present in an amount of from about 1.0 to about 8 grams per liter, and the molybdenum ion is present in solution in an amount of from about 0.007 gram per liter to about 8.0 grams per liter.

14. The process of claim 13 wherein the monoaryl compound is present in an amount of from about 0.8 mol per liter to about 3.0 mols per liter, based on the total amount of solution present, and the molybdenum ion has an oxidation state of 6+.

15. The process of claim 14 wherein the monoaryl compound is p-xylene.

16. The process of claim 15 wherein there is present 0.001 to 0.02 mol per liter of water.

17. The process of claim 16 wherein the initiator is selected from the group consisting of acetaldehyde, paraldehyde and methyl ethyl ketone.

18. The process of claim 17 wherein the molybdenum ion is present in an amount of from about 0.08 gram per liter to about 6.0 grams per liter.

References Cited

UNITED STATES PATENTS

| | | | |
|---|---|---|---|
| 2,245,528 | 6/1941 | Loder | 260—524 |
| 2,964,559 | 12/1960 | Burney et al. | 260—524 |
| 3,055,839 | 9/1962 | Melchiore | 260—524 |

JAMES O. THOMAS, JR., Primary Examiner

R. WEISSBERG, Assistant Examiner

U.S. Cl. X.R.

260—523R